United States Patent [19]

Ogawa et al.

[11] 4,274,785
[45] Jun. 23, 1981

[54] METHOD AND APPARATUS FOR CHARGING ANODE SCRAPS TO A CONVERTER FURNACE

[75] Inventors: Kunio Ogawa; Hiromitsu Iio, both of Niihama, Japan

[73] Assignee: Sumitomo Metal Mining Co. Ltd., Tokyo, Japan

[21] Appl. No.: 56,638

[22] Filed: Jul. 11, 1979

[30] Foreign Application Priority Data

Aug. 1, 1978 [JP] Japan .................................. 53-93961

[51] Int. Cl.³ .............................................. F27B 5/12
[52] U.S. Cl. .................................... 414/173; 266/183; 414/198; 414/786
[58] Field of Search ............... 414/147, 160, 167, 786, 414/171–173, 187, 198, 199, 208; 266/176, 183

[56] References Cited

U.S. PATENT DOCUMENTS 3,495,814  2/1970  Kirkland ........................ 414/187 X
3,768,626  10/1973  Vossler et al. .................... 414/198 X Primary Examiner—Robert G. Sheridan
Attorney, Agent, or Firm—Watson, Cole, Grindle & Watson

[57] ABSTRACT

In the disclosed method and apparatus, an anode scrap pile is formed by piling anode scraps to be of a predetermined height. The anode scrap pile is conveyed to a substantially U-shaped inclinable chute having a rectangular bottom and parallel side walls rising from the opposed long edges of the bottom, the distance between the opposed side walls being slightly greater, preferably about 5 cm, than the height of the pile. The pile is then pushed with cylinders in toward the bottom of the above-mentioned inclinable chute which has the open side between the side walls directed in the horizontal direction and the side walls positioned horizontally so as to receive the anode scrap pile. The inclinable chute into which the anode scrap pile has been pushed is rotated with a cylinder so that the bottom of the chute is downward and the side walls of the chute are in the vertical direction. The anode scrap pile in the inclinable chute is pushed through a fixed chute bridging the inclinable chute and a window free to open and close provided in the side wall at the hood of a converter furnace so as to charge the pile into the converter furnace. By such a method and apparatus, a converter furnace can be charged with anode scraps without stopping of the blowing of the converter furnace.

22 Claims, 3 Drawing Figures

METHOD AND APPARATUS FOR CHARGING ANODE SCRAPS TO A CONVERTER FURNACE

BACKGROUND OF THE INVENTION

1. Field of the Invention

This invention relates to a method and apparatus for feeding a converter furnace with anode scraps consisting of crude metals used in electrolytic cells, the feeding being accomplished while blowing is maintained in the converter furnace.

2. Description of the Prior Art

In operation of a copper converter, a large amount of heat is generated by an exothermic reaction caused by the oxidation of sulfur and iron with blowing. In order to economically utilize this heat and to protect the lining of the converter, it is necessary to charge the converter with cooling materials such as anode scraps, copper scraps, solidified mattes and other solids produced from a copper smelting furnace.

Granules and small blocks of these materials are charged in through a chute from the side wall of a hood on the furnace used for drawing exhaust gases during the blowing of the converter. A method of charging a converter with copper scraps pressed of a fixed shape from the side wall of a hood on the converter is suggested in Japanese patent publication No. 22889/51 published July 13, 1976. However, since anode scraps are quite large and not fixed in shape, it is difficult to utilize such an apparatus as is mentioned above to charge a converter with such anode scraps. Instead, a generally practiced method has been to stop the blowing of the converter and the suction of exhaust gases, fully opening the hood on the converter, transporting anode scraps contained in a container such as a charging boat with a crane, then charging the anode scraps into the converter through a working mouth of the converter.

Various problems are associated with the above method. For example, the operation rate of the converter will be reduced, exhaust gases low in $SO_2$ concentration will be drawn into the sulfuric acid plant when the blowing of the converter is stopped and resumed, and the operational control of the sulfuric acid plant becomes complicated. Furthermore, when the blowing of the converter is stopped and anode scraps are charged into the converter, gases containing $SO_2$ will leak out of the converter and, even if these gases are exhausted through the top of the factory so as to be harmless, the operating environment within the factory building is greatly deteriorated.

SUMMARY OF THE INVENTION

An object of the present invention is therefore to provide a method and apparatus for mechanically charging a converter with anode scraps of indefinite shapes derived from an electrolytic process without the necessity of stopping the blowing of the converter so as to eliminate problems such as those described above.

The method for charging a converter with anode scraps in accordance with the present invention comprises the steps of forming an anode scrap pile by piling anode scraps to a predetermined height, conveying said anode scrap pile toward a substantially U-shaped inclinable chute having opposed side walls and a bottom, the distance between the opposed side walls being slightly greater than the height of the anode scrap pile, pushing said anode scrap pile toward the bottom of the inclinable chute, the side walls of the chute being positioned horizontally so as to receive said anode scrap pile, rotating the inclinable chute into which the anode scrap pile has been pushed so that the bottom is downward and the side walls are in the vertical direction, and charging the anode scrap pile in said inclinable chute into the converter by pushing the pile through a fixed chute bridging said inclinable chute and a window provided in the side wall of a hood on the converter.

The apparatus for charging a converter with anode scraps comprises means for forming an anode scrap pile by piling anode scraps to a predetermined height, means for conveying said anode scrap pile to a substantially U-shaped inclinable chute having opposed side walls and a bottom, the distance between the side wall being slightly greater than the height of the anode screen pile, means for pushing said anode scrap pile in toward the bottom of the inclinable chute when the opening side between the side walls is directed in the horizontal direction and the side walls are positioned horizontally so as to receive said anode scrap pile, means of rotating the inclinable chute into which said anode scrap pile has been pushed so that the bottom is downward and the side walls are in the vertical direction, and means for charging the anode scrap pile in said inclinable chute into a converter by pushing said pile through a fixed chute bridging said inclinable chute and a window provided in the side wall at a hood on the converter.

Further objects, advantages and features of the present invention will become more fully apparent from a detailed consideration of the arrangement and construction of the constituent parts as set forth in the following specification taken together with the accompanying drawings.

DETAILED DESCRIPTION OF THE PREFERRED EMBODIMENTS

Figure 1:
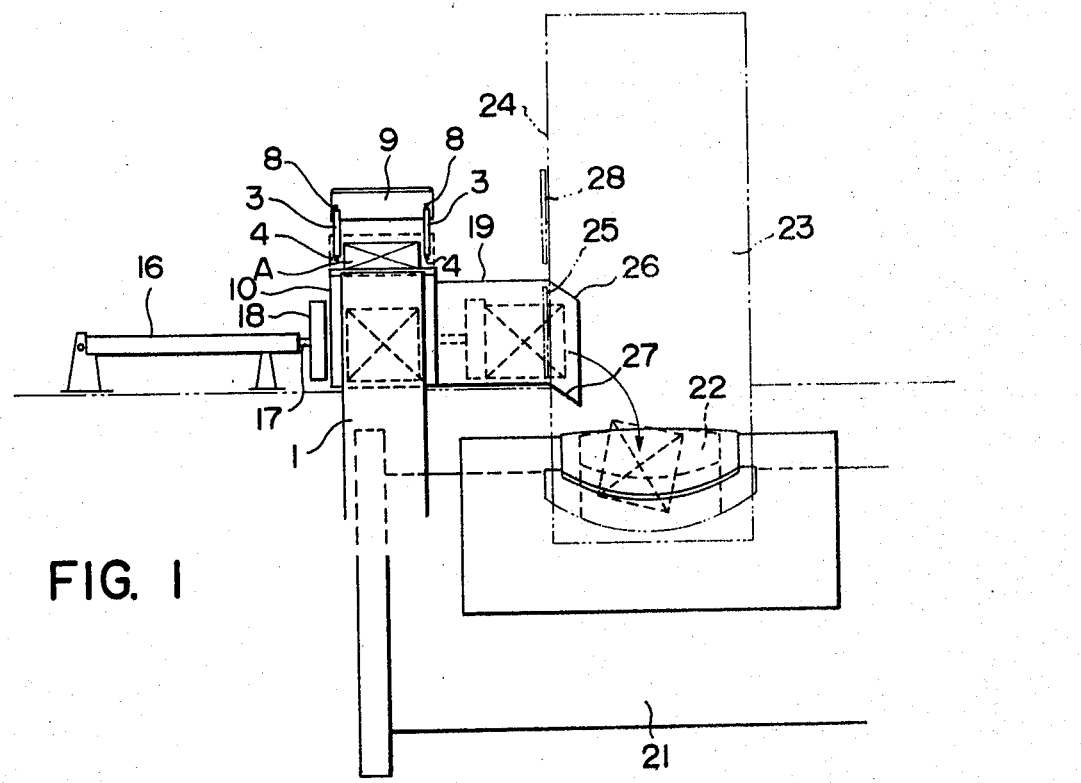
FIG. 1 is an elevation of one embodiment of the apparatus according to the present invention.

In FIG. 1, the apparatus in accordance with the present invention includes conveyor 1 for conveying anode scraps upward on the side of the axial direction of a converter and in a direction at right angles with the inclining axis of the converter and, in this embodiment, is in the form of an apron conveyor. Alternatively, conveyor 1 might just as well be in the form of a turntable.

Anode scrap pile A formed by piling an appropriate number of anode scraps is mounted and conveyed at predetermined intervals on conveyor 1. The individual anode scraps will usually be thick in the upper portion (on the hanger side) and thin in the lower portion which is suspended within an electrolytic cell. Therefore, when a plurality of scraps which have been arranged in the same direction are piled, the height at one side of the pile will become so large that the pile will be unstable. Therefore, it is preferable to alternately combine the thick sides and thin sides of separate scraps so that the uppermost scrap of the pile is horizontal. That is to say, the scrap pile is formed by piling alternating directed anode scraps each having a thick side and a thin side.

Figure 2:
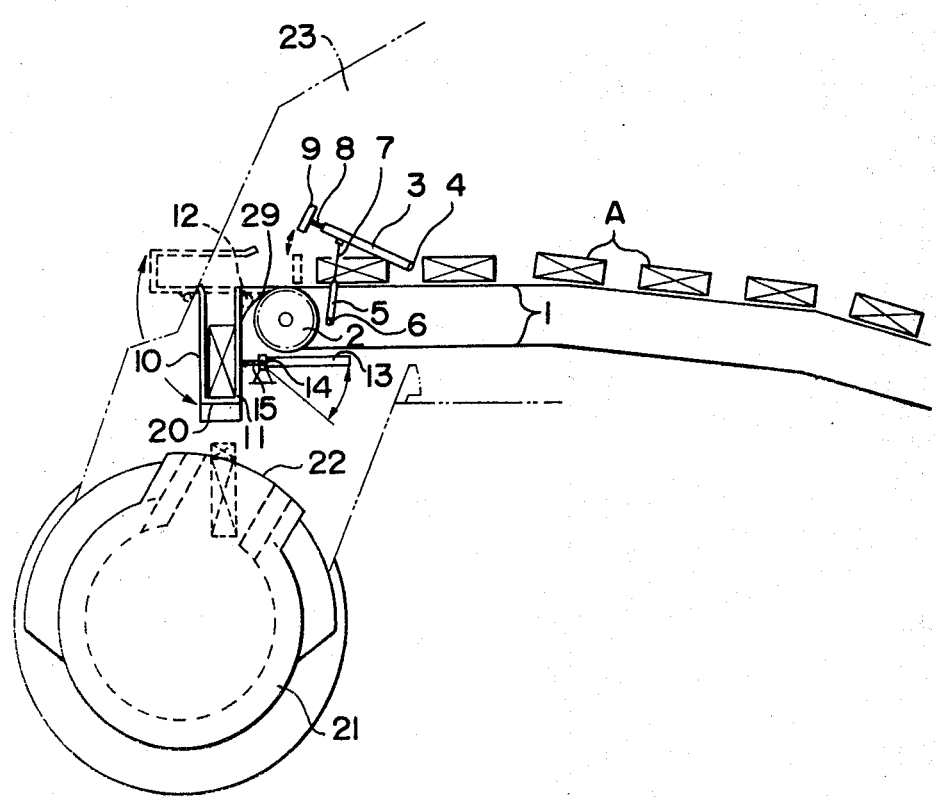
FIG. 2 is a side view of the embodiment of FIG. 1.

As shown in FIG. 2, sprocket wheel 2 drives the front end of conveyor 1. Pushing cylinders 3 are each pivotably mounted at one end by pin 4 which projects at right angles to the advancing direction of conveyor 1 and which projects from each side of a conveyor frame near the front end of the conveyor. Lifting cylinders 5 are each pivotably mounted by pin 6 projecting in the same manner as pin 4 from each side of the frame. The tip of piston rod 7 of lifting cylinder 5 is connected to pushing cylinder 3 near the opposite end of the pin 4 of pushing cylinder 3.

Pushing head 9 is provided above and across conveyor 1 and is connected with the end of piston rod 8 of each pushing cylinder 3 which are located on each side of the conveyor 1. When piston rod 7 of lifting cylinder 5 is retracted into the lifting cylinder, pushing head 9 will be in a position so as to forwardly push anode scrap pile A on the conveyor 1. When piston rod 7 projects out of lifting cylinder 5, pushing head 9 will be lifted and the next anode scrap pile A mounted on conveyor 1 can pass beneath pushing head 9 in accordance with the advance of the conveyor.

Situated at the front end of the advancing direction of the conveyor 1 is substantially U-shaped inclinable chute 10 for receiving anode scrap pile A from conveyor 1. Inclinable chute 10 is rotatably supported on side wall 11 about shaft 12 located near the outer periphery of sprocket wheel 2 of conveyor 1 and parallel with the driving shaft of the sprocket wheel. Inclinable chute 10 is open on both sides in the direction intersecting at right angles with the inclining axis of the converter. Inclinable chute 10 has narrow rectangular bottom 20 and side walls 11 extending parallel to each other and at right angles with the bottom from the opposed long edges of the bottom. Anode scrap pile A is formed by piling anode scraps so that the pile has a height slightly smaller than the clearance between side walls 11 of chute 10.

Cylinder 13 is for rotating inclinable chute 10 and is rotatably supported near the end of the cylinder having projecting piston rod 15. The tip of piston rod 15 of cylinder 13 is connected to side wall 11 of inclinable chute 10 such that when the piston rod is retracted into the inclining cylinder, bottom 20 is down and the side wall 11 is substantially vertical and, when the piston rod projects out of the inclining cylinder, the side wall is substantially horizontal and the free ends of the chute 10 is directed toward the front end of conveyor 1 so as to be able to receive anode scrap pile A on the conveyor when the pile is pushed out by pushing head 9.

Figure 3:
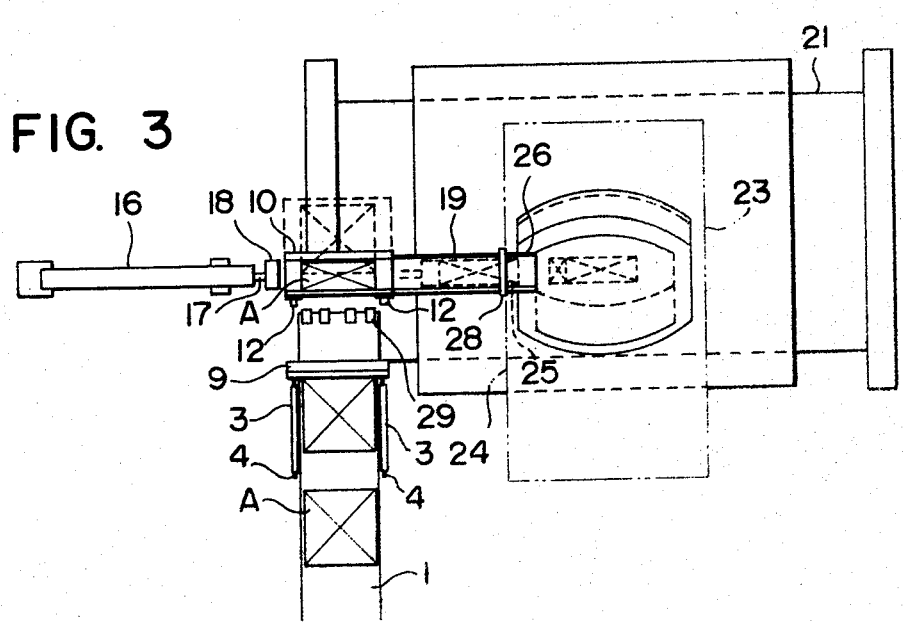
FIG. 3 is a plan view of the embodiment of FIG. 1.

As shown in FIGS. 1 and 3, horizontally fixed charging cylinder 16 is located adjacent to chute 10 when in the down position. Lateral feeding head 18 is attached to the tip of piston rod 17 of charging cylinder 16 and is positioned so as to be able to enter inclinable chute 10 through the open side of the chute when side wall 11 becomes vertical. Fixed chute 19 having substantially the same cross-section as inclinable chute 10 is located on the opposite side from the lateral feeding head 18 and extends in the direction of the inclining axis of the converter and of inclinable chute 10 in the down position hereof.

The converter includes converter body 21, working mouth 22, and converter hood 23 having side wall 24. Fixed chute 19 connects vertically positioned inclinable chute 10 and side wall 24 of hood 23 and the end of the fixed chute 19, to the side wall of the hood. Window 25 of the same shape as the cross-section of the fixed chute 19 is located in side wall 24 of hood 23 and is provided with damper 28 to prevent air from leaking in through the window. Furthermore, means are provided for opening window 25 by pulling up damper 28 only when the anode scrap pile A is charged through side wall 24 of hood 23. Inclined chute 26 is fixed as an extension of fixed chute 19 along the edges of window 25 inside side wall 24 of hood 23, is inclined on bottom surface 27 toward working mouth 22, and is formed as a water-cooled jacket.

When piston rod 17 of charging cylinder 16 is retracted, lateral feeding head 18 will be out of inclinable chute 10 so that the inclinable chute 10 may be rotated without any interference. When the piston rod 17 is projected out of charging cylinder 16, lateral feeding head 18 is moved so that anode scrap pile A passes through inclinable chute 10, fixed chute 19 and inclined chute 26 and drops into working mouth 22.

The method of the present invention using the above described apparatus is set forth in the following. When anode scrap pile A formed by piling anode scraps as mentioned above are placed at appropriate intervals on conveyor 1 and are intermittently advanced, the pile eventually will partially enter inclined chute 10 with side wall 11 horizontal at the front end of the conveyor through transfer chute 29. Conveyor 1 will then be stopped by the action of a limit switch (not illustrated). When piston rod 8 is retracted into pushing cylinder 3 and piston rod 7 is retracted into lifting cylinder by the action of a hydraulic sequence control system, pushing head 9 will be positioned on conveyor 1 between anode scrap pile A having partially entered inclinable chute 10 and the next anode scrap pile A in the advancing direction. Piston rod 8 will then be extended out of pushing cylinder 3 and the anode scrap pile A will be pushed until it contacts bottom 20 of inclinable chute 10. When pile A is thus pushed completely into chute 10, the pushing head 9 will contact a limit switch (not illustrated), piston rod 8 will be retracted, therefore the hydraulic sequence system will act and the piston rod 7 will be extended so that pushing head 9 will not impede the next anode scrap pile A from being moved by a subsequent operation of conveyor 1. When the piston rod 8 is retracted, a limit switch (not illustrated) will act, piston rod 15 will be retracted into inclining cylinder 13, the inclinable chute 10 will be rotated to the vertical direction where it will contact a limit switch (not illustrated), so that piston rod 17 will be extended out of charging cylinder 16 and anode scrap pile A within inclinable chute 10 will be pushed by lateral feeding head 18. After pile A is pushed from inclinable chute 10 to fixed chute 19, then laterally slides through the fixed chute and passes through side wall 24 of hood 23, the position of lateral feeding head 18 will be sensed by an optical or electrical means (not shown) and damper 28 will be lifted so as to open window 25. When piston rod 17 is further extended, anode scrap pile A will drop into working mouth 22 through water-cooled inclined chute 26. When the converter is thus charged with anode scrap pile A, piston rod 17 will be retracted, the position of head 18 will be sensed with the above mentioned optical or electrical means and window 25 will be closed by damper 28. When piston rod 17 retracts completely into cylinder 16, the lateral feeding head 18 will contact the limit switch, piston rod 15 will be extended by cylinder 13, inclinable chute 10 will be returned to the horizontal position and then the operation of conveyor will be resumed. The inclined chute 26 is provided to be extended above the inner edge of the working mouth 22 so that the anode scrap pile A may be dropped into the converter without colliding or impacting with the periphery of the working mouth.

In the above described apparatus, a turntable can be used instead of apron conveyor 1. Pushing cylinder 3 for moving the pushing head 9 forward and rearward is moved up and down by lifting cylinder 5 located below pushing cylinder 3. The lifting cylinder 5 may be located above the pushing cylinder 3. As is apparent, the height of anode scrap pile A to be placed on conveyor 1 must be smaller than the distance between opposed side walls 11 of inclinable chute 10. However, if the height of pile A is too low, when the pile is pushed in to the extremity in the horizontal position of inclinable chute 10 and is then set in the vertical direction in the vertical position of the chute, the pile will fall on the side. Subsequently, when anode scrap pile A is pushed out toward converter by lateral feeding head 18 and separates from inclined chute 26, the pile will tend to fall further in the horizontal direction and is more likely to contact working mouth 22 or the like. Therefore, a low height for the pile relative to the side walls 11 is not desirable. In the practical operation, the piled height of the anode scrap pile A should be from 2 to 10 cm, preferably about 5 cm, smaller than the distance between side walls 11.

When the anode scrap is shoulder-typed and the vertical direction of the anode as suspended in the electrolytic cell is made to coincide with the advancing direction of conveyor 1, collapse of the piled anode scraps will be reduced. That is to say, in the present invention, when anode scraps are piled to be of the same height, pile A is made of a height sufficient to just enter inclinable chute 10 and when the chute is erected, the anode scrap pile will be vertical. When pile A is caused to slide in the lateral direction, the pile A will be able to be dropped into working mouth 22 with the piled anode scraps maintained substantially piled to each other. As a consequence, the anode scraps can be made to mechanically pass through the side wall 24 of the converter hood 23 by using the path of the smallest cross-section and can be therefore charged into the converter through working mouth 22 while the escape of the converter exhaust gases is prevented and while the blowing of the converter and drawing of the exhaust gases is maintained. The effect of the method and apparatus of the present invention is that the efficiency of the converter operation can be improved to a level higher than has been previously obtained.

While the present invention has been described with reference to particular embodiments thereof, it will be understood that numerous modifications may be made by those skilled in the art without actually departing from the spirit and scope of the invention as defined in the appended claims.

We claim:

1. A method for charging a converter furnace with anode scraps comprising the steps of forming an anode scrap pile by piling anode scraps to a predetermined height, conveying said anode scrap pile toward structure defining a substantially U-shaped anode scrap receiving pocket having opposed side walls and a bottom, the distance between said opposed side walls being slightly greater than the height of the anode scrap pile, pushing said anode scrap pile toward the bottom of the pocket, the side walls of the structure being positioned horizontally so as to receive said anode scrap pile, rotating the pocket defining structure into which the anode scrap pile has been pushed so that the bottom is downward and the side walls are in the vertical direction, and charging the anode scrap pile in said pocket into the converter furnace by pushing the pile through a fixed chute bridging said structure and means defining a window in a hood of the converter furnace.

2. The method according to claim 1 wherein the piled height of said pile is from 2 to 10 cm smaller than the distance between the side walls of said structure.

3. The method according to claim 2 wherein said piled height is about 5 cm smaller than said distance between the side walls.

4. The method according to claim 1 wherein said pile is conveyed by an apron conveyor.

5. The method according to claim 1 wherein a pushing cylinder pivotably mounted at one end is utilized to push said pile into said pocket.

6. The method according to claim 5 wherein said pushing cylinder is pivoted by a lifting cylinder so that when the pushing cylinder is pushing, the lifting cylinder may retract and when the lifting cylinder is pushing, the pushing cylinder may retract.

7. The method according to claim 5 wherein said pushing cylinder is pivoted by a lifting cylinder so that when the pushing cylinder is pushing, the lifting cylinder may push, and when the lifting cylinder is retracting, the pushing cylinder may retract.

8. The method according to claim 1 wherein said structure is rotated by a cylinder mechanism.

9. The method according to claim 1 wherein said pile is pushed and charged into the converter by a charging cylinder.

10. The method according to claim 9 wherein said charging cylinder is operable only when the side walls of the inclinable chute are in the vertical direction.

11. The method according to claim 1 wherein said window of the converter hood is open only when the pile is pushed and charged into the converter.

12. An apparatus for charging a converter furnace with anode scraps comprising means for forming an anode scrap pile by piling anode scraps to a predetermined height, means for conveying said anode scrap pile to structure defining a substantially U-shaped anode scrap receiving pocket having opposed side walls and a bottom, the distance between the side wall being slightly greater than the height of the anode scrap pile, means for pushing said anode scrap pile in toward the bottom of the pocket when the opening side between the said walls is directed in the horizontal direction and the side walls are positioned horizontally so as to receive said anode scrap pile, means for rotating the pocket defining structure into which said anode scrap pile has been pushed so that the bottom of the pocket is downward and the side walls are in the vertical direction, and means for charging the anode scrap pile in said pocket into a converter furnace by pushing said pile through a fixed chute bridging said structure and means defining a window in a hood for the converter furnace.

13. The apparatus according to claim 12 wherein the piled height of said pile is from 2 to 10 cm smaller than the distance between the side walls of said pocket defining structure.

14. The apparatus according to claim 13 wherein said height is about 5 cm smaller than that said distance between the side walls.

15. The apparatus according to claim 12 wherein said conveying means is an apron conveyor.

16. The apparatus according to claim 12 wherein said means for pushing the pile into the pocket is a pushing cylinder pivotably mounted at one end.

17. The apparatus according to claim 16 wherein a lifting cylinder for pivoting said pushing cylinder is provided such that, when the pushing cylinder is pushing, the lifting cylinder may retract and, when the lifting cylinder is pushing, the pushing cylinder may retract.

18. The apparatus according to claim 16 wherein a lifting cylinder for pivoting said pushing cylinder is provided such that, when the pushing cylinder is pushing, the lifting cylinder may push and, when the lifting cylinder is retracting, the pushing cylinder may retract.

19. The apparatus according to claim 12 wherein said means for rotating the structure is a cylinder mechanism.

20. The apparatus according to claim 12 wherein said means of pushing and charging the pile into the converter is a charging cylinder.

21. The apparatus according to claim 20 wherein said charging cylinder is operable only when the side walls of the structure are positioned in the vertical direction.

22. The apparatus according to claim 12 wherein said window of the converter hood is open only when the pile is pushed and charged into the converter.

* * * * *